(12) United States Patent
Hsu (10) Patent No.: US 8,408,796 B1
(45) Date of Patent: Apr. 2, 2013

(54) ROLLING ELEMENT RETAINER BELT AND LINEAR MOTION GUIDE APPARATUS

(75) Inventor: Ming-Che Hsu, Tainan (TW)

(73) Assignee: Chieftech Precision Co., Ltd., Tainan (TW)

( * ) Notice: Subject to any disclaimer, the term of this patent is extended or adjusted under 35 U.S.C. 154(b) by 0 days.

(21) Appl. No.: 13/301,376

(22) Filed: Nov. 21, 2011

(51) Int. Cl.
*F16C 29/06* (2006.01)
(52) U.S. Cl. .......................................... 384/45; 384/51
(58) Field of Classification Search .................. 384/43, 384/45, 51
See application file for complete search history.

(56) References Cited

U.S. PATENT DOCUMENTS

| 5,927,858 A | 7/1999 | Agari | |
|---|---|---|---|
| 5,947,605 A | 9/1999 | Shirai | |
| 6,155,718 A | 12/2000 | Takamatsu et al. | |
| 7,563,029 B2 * | 7/2009 | Wu et al. ........................ | 384/51 |
| 7,802,922 B2 * | 9/2010 | Chen .............................. | 384/51 |
| 8,297,843 B2 * | 10/2012 | Hsu ............................... | 384/45 |
| 2002/0044703 A1 * | 4/2002 | Itabashi ......................... | 384/45 |
| 2006/0013517 A1 * | 1/2006 | Kato .............................. | 384/51 |
| 2007/0076989 A1 * | 4/2007 | Matsumoto et al. ............ | 384/45 |
| 2008/0025653 A1 * | 1/2008 | Matsumoto ..................... | 384/43 |

FOREIGN PATENT DOCUMENTS

TW  I273185  2/2007

* cited by examiner

*Primary Examiner* — Thomas R Hannon
(74) *Attorney, Agent, or Firm* — Muncy, Geissler, Olds & Lowe, PLLC (57) ABSTRACT

A distortable rolling element retainer belt and a linear motion guide apparatus include a flat belt with holes defined therein and a separating portion is located between the adjacent holes. An upper spacer and a lower spacer are connected to each separating portion and a recess is defined between each separating portion and the upper spacer as well as between each separating portion and the lower spacer. The two recesses are located at different sides of the upper and the lower spacers so that the spacers on the rolling element retainer belt can be distorted to overcome the resistance from bending when the rolling elements traveling in a circulating passage which is not perpendicular to the surface of the rolling element retainer belt.

12 Claims, 7 Drawing Sheets

ROLLING ELEMENT RETAINER BELT AND LINEAR MOTION GUIDE APPARATUS

FIELD OF THE INVENTION

The present invention relates to a distortable rolling element retainer belt and a linear motion guide apparatus composed of the rolling element retainer belt, and more particularly, to a retainer belt having multiple rolling elements separated between the separators and the retainer belt is distorted to overcome resistance when the rolling elements move in a circulating passage that is not perpendicular to the surface of the retainer.

BACKGROUND OF THE INVENTION

A conventional linear motion mechanism includes a motion member and an axial rail member, wherein each of the motion member and the rail member provides at least one rail and the two respective rails are located corresponding to each other. A series of rolling elements are movable between and in contact with the rails. The motion elements provide a return passage and two direction changing passages to each of the rails corresponding thereto. The direction changing passages are connected to the straight return passages, the entry of the rail and the exit of the rail to form the circulating passage so that the rolling elements enter the return passage via the direction changing passage and then enter the other rail via the return passage and the direction changing passage. The rolling elements are movable within the circulating passage, and the movable member is movable along the rails by the rolling elements.

In order to avoid from impact between the rolling elements, U.S. Pat. No. 5,927,858 discloses separators between the rolling elements. However, there is clearance between the separators and the rolling elements so that the separators tend to be tilted and shifted, such that the separators interfere with the circulating passage and affect the motion of the rolling elements.

U.S. Pat. No. 5,947,605 and U.S. Pat. No. 6,155,718 disclose a rolling element retainer belt which has two axial and thin strips and the separators are connected to the strips, and the rolling elements are located and retained between the separators. The belt is an elongate, flat and flexible, so that the belt can be deformed in the direction perpendicular to the plane composed of the two strips and the plane is named the plane of the belt. However, the belt has higher stiffness in the perpendicular direction so that resistance is generated when deformed in the perpendicular direction. Accordingly, the rolling element retainer belt is suitable for being operated on the plane that is perpendicular to the plane of the belt and suitable for being deformed on a two-dimension plane. When the circulating passage is not located on the plane, the belt has to deform toward the direction that is inclined to the belt, and has to overcome the resistance in the perpendicular direction. In other words, the belt has to overcome the resistance when deforming toward the perpendicular direction. Thus, the rolling element retainer belt cannot move smoothly.

Taiwan Patent No. 1273185 discloses a rolling element retainer belt which improves the inherent problems of the above-mentioned conventional rolling element retainer belt, and comprises multiple rolling elements and a belt which provides multiple holes in which the rolling elements are accommodated. The retainer belt includes multiple separators which separate the adjacent rolling elements. At least two thin and elongate resilient strips are connected to two ends of transverse resilient belts. The transverse resilient belts are connected to the separators at the mediate portions thereof. The transverse resilient belts are ensured to have the longest length and sufficient flexibility and can be deformed toward two opposite directions. The separators can be rotated and tilted in different directions relative to the transverse resilient belts. The rolling element retainer belt has sufficient degrees of freedom to change direction in the three-dimensional circulating passage so as to be smoothly operated with less resistance.

However, the two ends of the transverse resilient belts connected to the resilient strips, and the separators connected to the transverse resilient belts provide the retainer belt with higher degrees of freedom when deforming. However, because the connection area between the separators and the resilient belts are limited, the structural strength may not be sufficient when the retainer belt continuously turns. Furthermore, the clearance between the rolling elements and the resilient belts makes the rolling elements shift and the resilient belts cannot position the rolling elements.

The present invention intends to provide a rolling element retainer belt which has a mounting surface for mounting the rolling elements so that when the rolling element retainer belt turns continuously, the rolling elements are well positioned and the retainer belt deforms properly to overcome the resistance when the turning.

SUMMARY OF TILE INVENTION

The present invention relates to a rolling element retainer belt and comprises an elongate and flat belt and multiple separators. The retainer belt has multiple holes defined axially therein and separation portions are located between the holes. Each separator has an upper spacer and a lower spacer, and the upper and lower spacers are located on two sides of the separation portion. Two recesses are respectively defined between the upper spacer and the separation portion and between the lower spacer and the separation portion. The two respective recesses are located at different sides of the upper and the lower spacers.

Preferably, each hole defines an inner surface between the upper and lower spacers and located in a direction perpendicular to the belt. The upper and lower spacers each have a smooth surface adjacent to the hole. The smooth surfaces each partially have a rolling element mounting surface which is smoothly connected with the inner surface of the belt. The inner surface is connected with the rolling element mounting surface of the adjacent upper spacer or the adjacent lower spacer to form a top mounting surface or a lower mounting surface. The rolling element mounting surface has an opening and a part of the smooth surface extends from the opening in tangent direction and forms a curved surface. The direction of the opening of the top mounting surface/lower mounting surface is located at an angle between the vertical direction and the horizontal direction of the belt. The rolling element mounting surfaces of the upper spacer, lower spacer are located on opposite sides. The directions of the openings are opposite to each other. The recesses are located in the curved surfaces of the smooth surfaces.

Preferably, the rolling element mounting surfaces are spherical mounting surfaces or cylindrical mounting surfaces.

Preferably, the curved surfaces are cylindrical surfaces or cone-shaped surfaces.

The present invention relates to a linear motion guide apparatus and comprises a rail having a first passage in a side thereof and a block is mounted to the rail and has a second passage which is located corresponding to the first passage.

Two direction changing passages are located on two ends of the second passage. The two direction changing passages are connected with a straight return passage. A circulating passage is formed by the second passage, the direction changing passages and the return passage. The circulating passage has at least one enclosed guide slot defined therein. The rolling element retainer belt has at least one of two sides thereof located in the guide slot. The rolling element retainer belt has holes defined therein and each hole has a rolling element received therein. The rolling element retainer belt moves along the circulating passage by moving the rolling elements within the circulating passage such that the rolling element retainer belt is ensured to move along the correct path.

The advantage of the present invention is that a notch is formed during the injection molding and located between the curved surface on the smooth surface of the upper spacer and the lower spacer and the separation portion so that when the rolling element retainer belt is moving in the circulating passage along the plane that is not perpendicular to the retainer belt surface, the upper and lower spacers are deformed to overcome the resistance. Besides, the structural strength between the upper and lower spacers and the separation portion is strong enough and the rolling element mounting surfaces retain the rolling elements in position.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
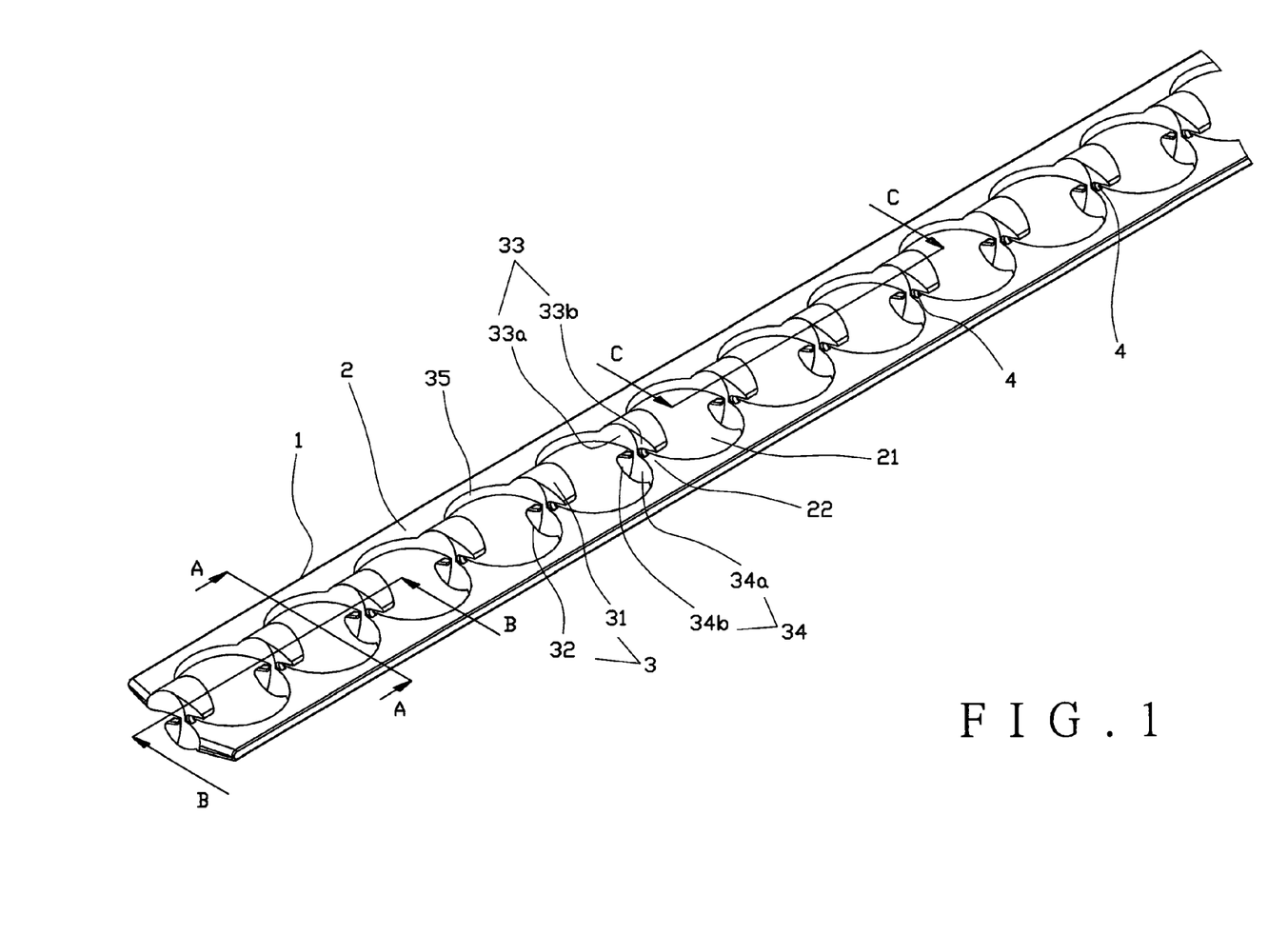
FIG. 1 is a perspective view to show the rolling element retainer belt of the present invention.
Figure 2:
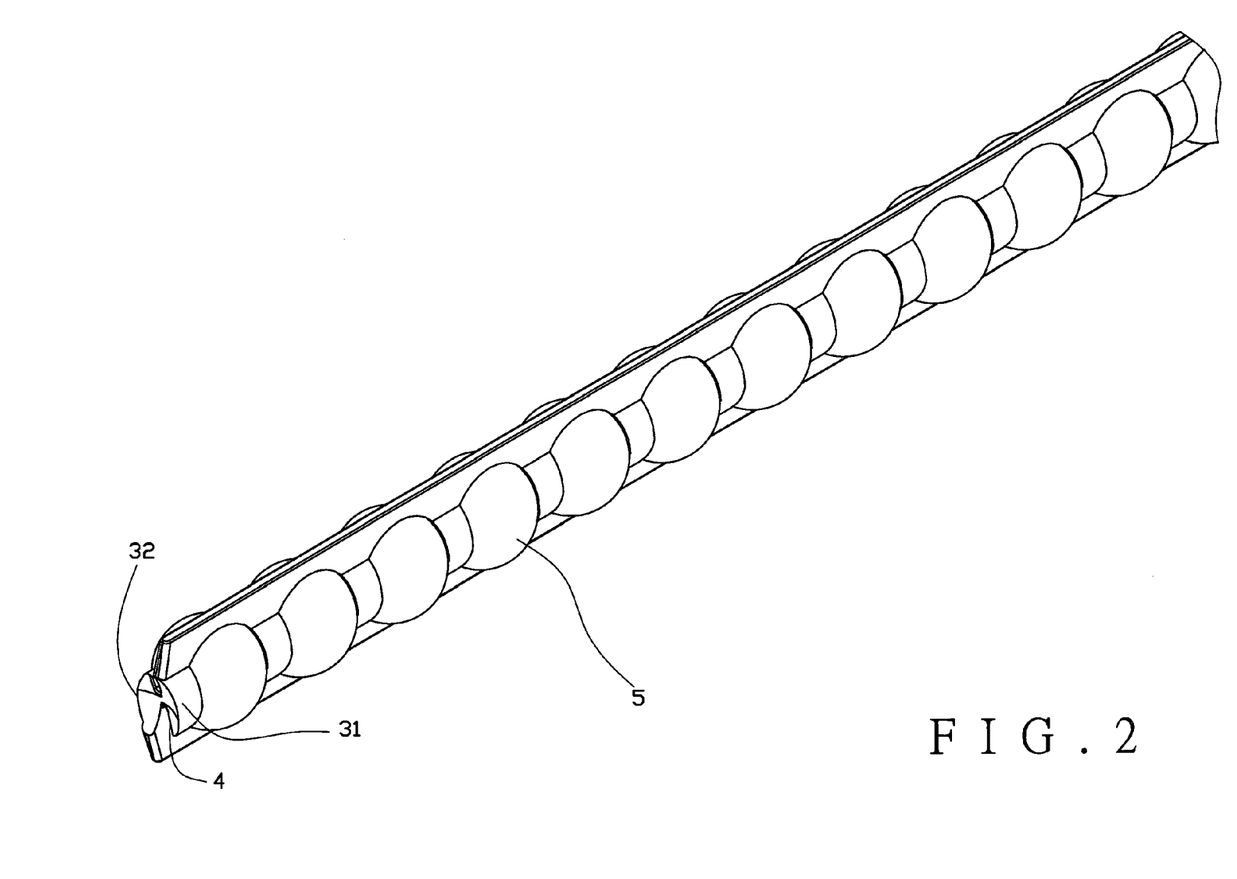
FIG. 2 is another perspective view to show the rolling element retainer belt and the rolling elements of the present invention.
Figure 6:
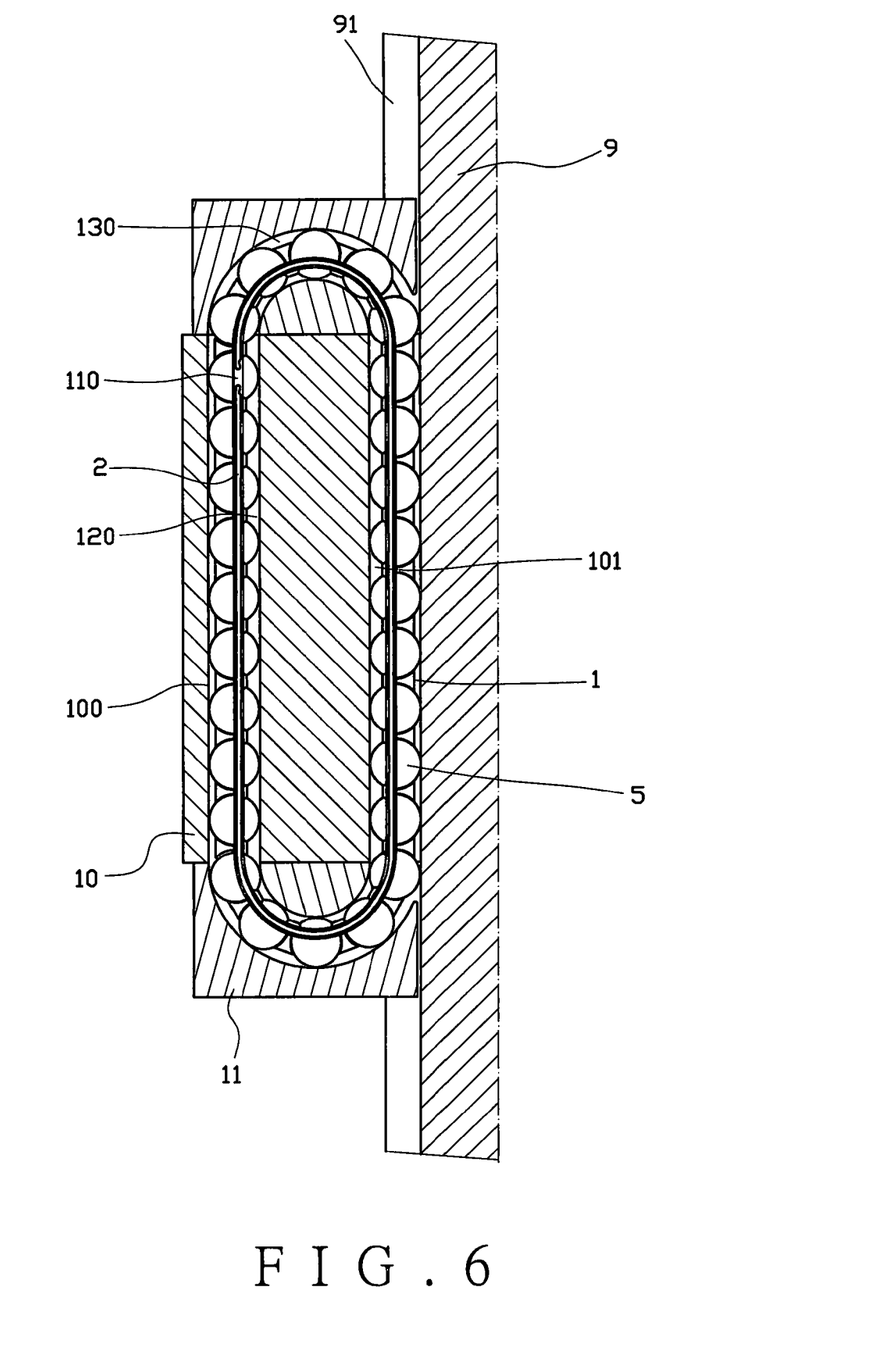
FIG. 6 shows that the rolling element retainer belt and the rolling elements of the present invention are located in the circulating passage of the linear motion guide apparatus.

Referring to FIG. 1, the rolling element retainer belt 1 of the present invention (the rolling element can be rolling cylinder) comprises an elongate and flat belt 2 and multiple separators 3, wherein the belt 2 has multiple holes 21 defined axially therein and separation portions 22 are located between the holes 21. Each separator 22 has a separator 3 mounted thereto and each separator 3 has an upper spacer 31 and a lower spacer 32. The upper and lower spacers 31, 32 are located on two sides of the separation portion 22. Each hole 21 defines an inner surface 35 between the upper and lower spacers 31, 32 and located in a direction perpendicular to the belt 2. As shown in FIG. 2, multiple rolling members 5 are engaged with the holes 21 and separated by the separators 3. When the linear motion guide apparatus moves along the circulating passage as shown in FIG. 6, the rolling elements 5 in the rolling element retainer belt 1 do not interfere with each other and move smoothly.

Figure 4:
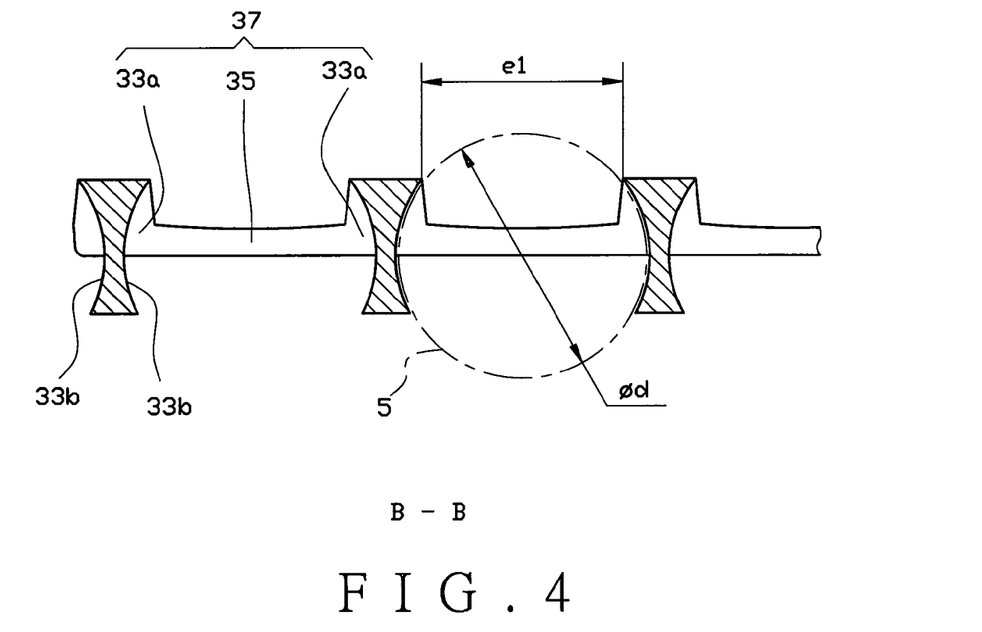
FIG. 4 is a cross sectional view, taken along line B-B of FIG. 1.
Figure 5:
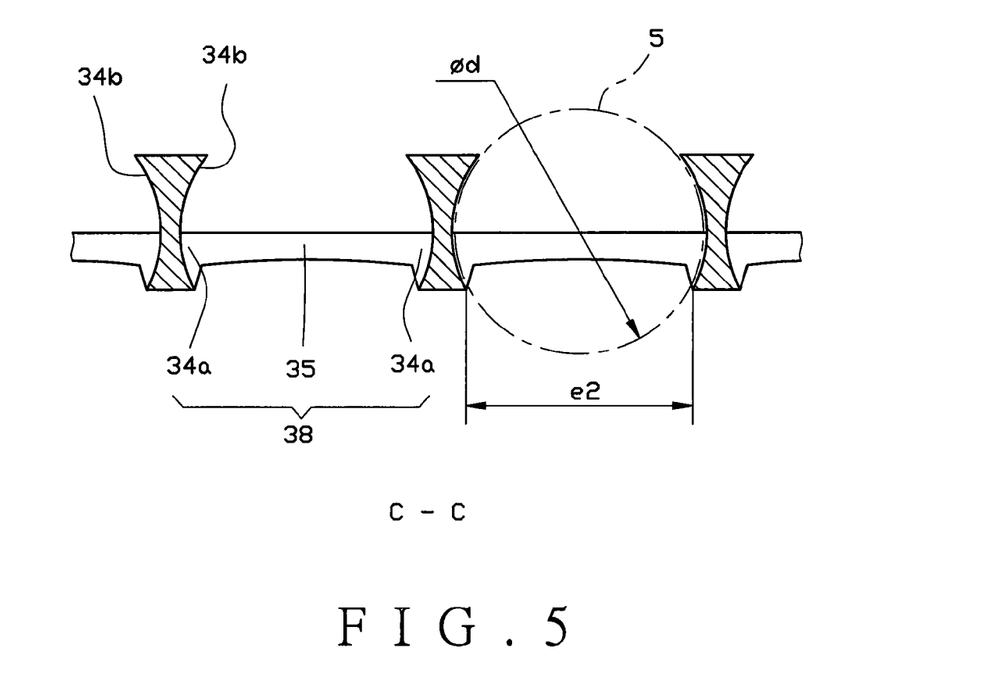
FIG. 5 is a cross sectional view, taken along line C-C of FIG. 1.

The upper and lower spacers 31, 32 each have a smooth surface 33/34 located adjacent to the hole 21 and a part of the smooth surface 33/34 is slightly larger than the spherical mounting surface 33a/34a of the rolling element 5. If the rolling elements are rolling cylinders, the mounting surface is cylindrical mounting surface. The smooth surface 33/34 is smoothly connected to the inner surface 35 of the belt 2, and the smooth surface 33/34 is connected with the spherical mounting surface 33a/34a of the adjacent upper spacer 31 or the adjacent lower spacer 32 via the inner surface 35 to form the top mounting surface 37 or the lower mounting surface 38. As shown in FIGS. 4 and 5, the end that the top/lower mounting surface 37/38 does not connect to the inner surface 35 defines an opening 39 in the smooth surface 33/34. The spherical mounting surfaces 33a, 34a are located on two opposite sides. The directions N1, N2 of the openings 39 of the spherical mounting surfaces 33a, 34a are opposite to each other, and the directions N1, N2 of the openings 39 of the spherical mounting surfaces 33a, 34a are located between the vertical direction "V" and the horizontal direction "H" of the cross section of the belt 2, as shown in FIG. 3.

As shown in FIGS. 4 and 5, the diameter e1/e2 of the opening of the spherical mounting surfaces 33a/34a on the upper spacer 31/lower spacer 32 and the inner surface 35 of the belt 2 is smaller than the diameter φd of the rolling elements 5, so that the rolling elements 5 are retained in the holes 21 of the belt 2 and do not tilt and shift. The rolling elements 5 do not interfere with the circulating passage. When the directions N1, N2 of the openings 39 of the spherical mounting surfaces 33a, 34a are tilted relative to the horizontal direction "H" of the belt 2 by larger angle, the areas of the spherical mounting surfaces 33a, 34a are larger, and more retaining force to the rolling elements 5 in the vertical direction "V" of the belt 2 as shown in FIG. 3.

Figure 3:
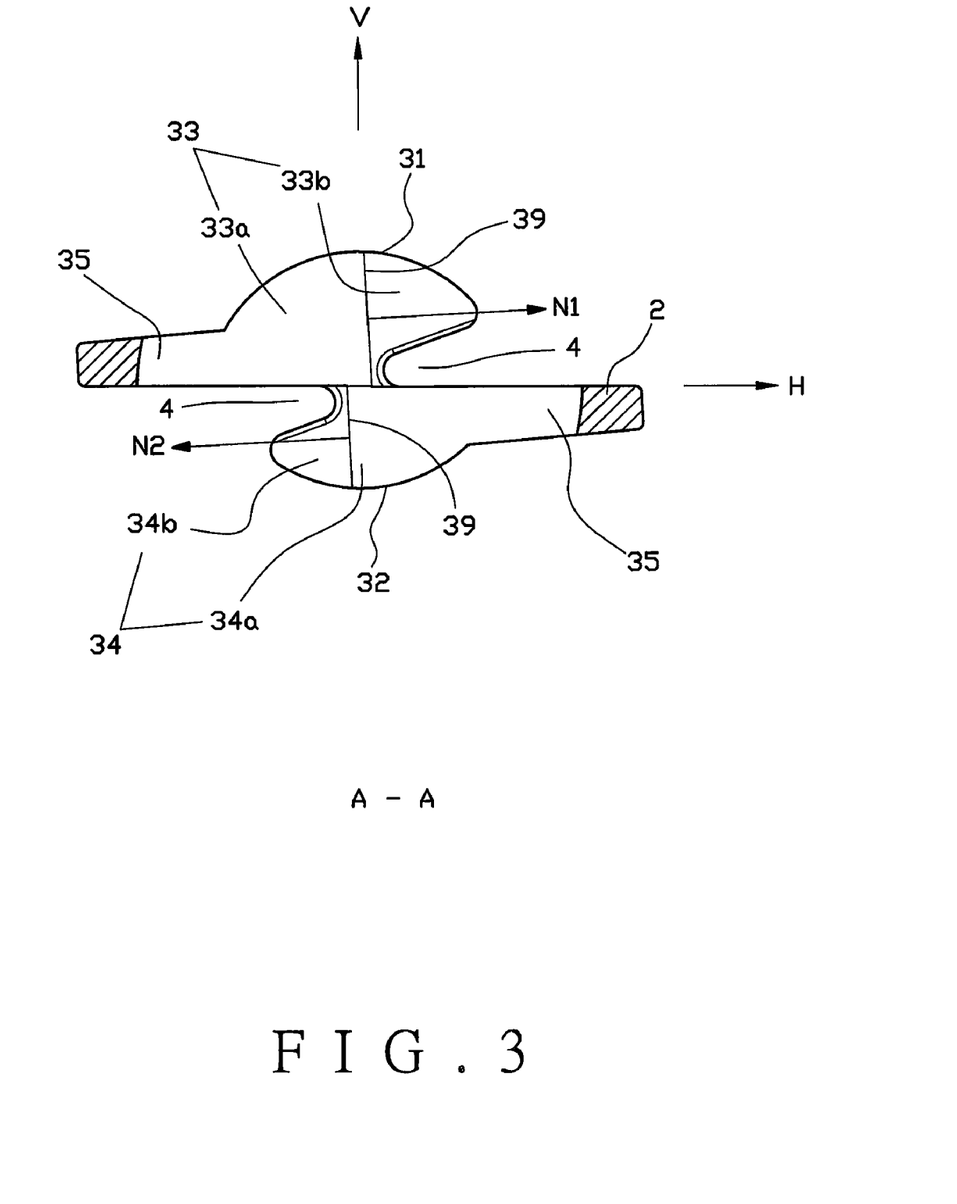
FIG. 3 is a cross sectional view, taken along line A-A of FIG. 1.

As shown in FIG. 3, the direction N1/N2 of the opening 39 of the top mounting surface 37/lower mounting surface 38 is located between the vertical direction "V" and the horizontal direction "H" of the belt 2, so that when the retainer belt 1 is manufactured by way of injection molding, the rolling element retainer belt 1 is separated from the molds at an angle and the rolling element retainer belt 1 can be obtained in one time. As shown in FIGS. 1 and 2, a part of the smooth surface 33/34 of the upper/lower spacer 31/32 extends from the opening 39 in tangent direction and forms a curved surface 33b/34b which can be a cylindrical or cone-shaped surface. Two recesses 4 are respectively defined between curved surfaces 33b, 34b of the smooth surfaces 33, 34 of the upper spacer 31 and the lower spacer 32 and the separation portion 22. The space between the rolling element 5 and the upper pacer 31 and the cylindrical or cone-shaped curved surfaces 33b, 34b of the lower spacer 32 is used to receive lubricant or grease.

As shown in FIG. 6, when the rolling element retainer belt 1 mentioned above is used for a linear motion mechanism, such as a linear rail which has a rail 9 and a first passage 91 located on one side of the rail 9. A block 10 is mounted to the rail 9 and has a second passage 101 which is located corresponding to the first passage 91. Two end pieces 11 are on two ends of the block 10 and each end piece 11 has at least one direction changing passage 130. One end of each of the direction changing passages 130 is connected to the second passage 101, and the other end of each of the direction changing passages 130 is connected to the straight return passage 120.

A circulating passage 100 is formed by the second passage 101, the direction changing passages 130 and the return passage 120. The circulating passage 100 has an enclosed guide slot 110 defined therein. When the rolling element retainer belt 1 and the rolling elements 5 in the holes 21 move in the circulating passage 100, the two sides of the rolling element retainer belt 1 are guided in the guide slot 110 so as to ensure that the rolling element retainer belt 1 moves on the correct position. By the movement of the rolling elements 5 in the first passage 91 and the second passage 101, the block 10 continuously moves along the first passage 91 of the rail 9.

Figure 7:
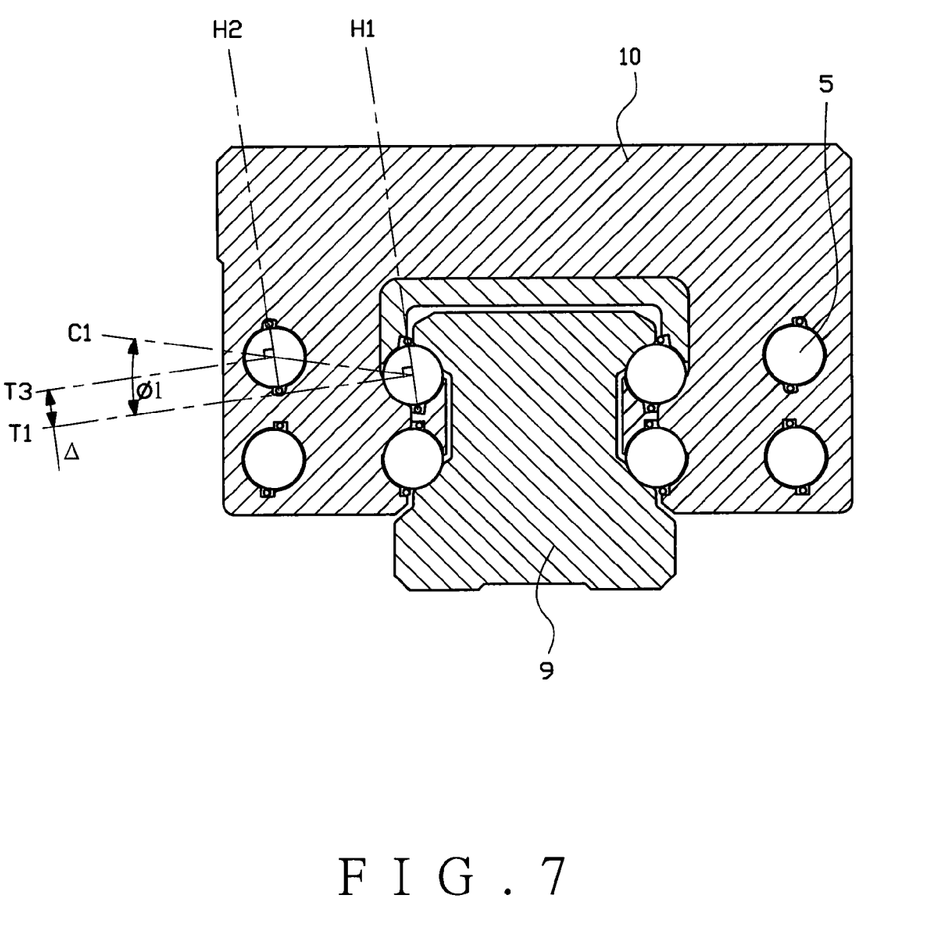
FIG. 7 shows that the return passage is not located on the perpendicular plane T1 of the guide plane H1.

As shown in FIG. 7, the guide slot 110 defines a guide plane H1 in the first and second passages 91, 101, and a guide plane H2 in the return passage 120. The return passage 120 is not necessarily located on the perpendicular plane T1 of the guide plane H1. The plane C1 composed of the center of the rolling elements 5 in the return passage 120 and the center of the rolling elements 5 in the first and second passages 91, 101 has an angle φ1 relative to the perpendicular plane T1 of the guide plane H1. Therefore, the perpendicular plane T1 of the guide plane H1 and the perpendicular plane T3 of the guide plane H2 has a displacement Δ. When the rolling element retainer belt 1 enters into the direction changing passage 130 from the first and second passages 91, 101, the rolling element retainer belt 1 deforms to generate resistance.

Figure 8:
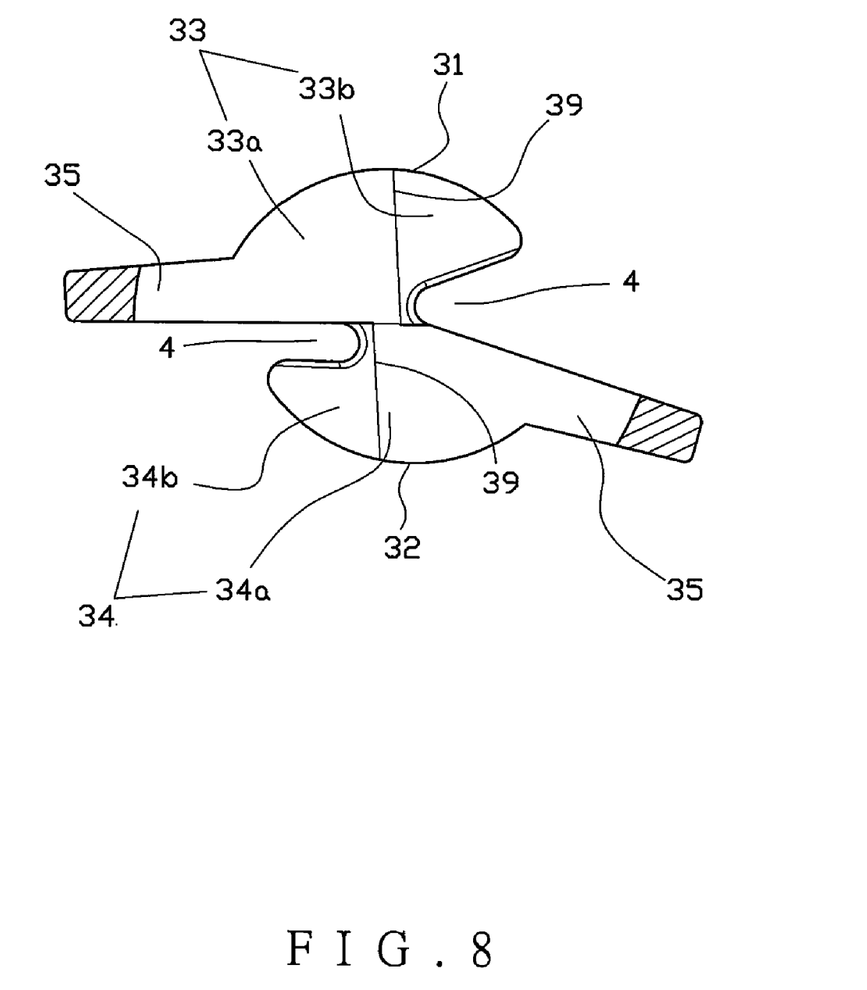
FIG. 8 shows that the rolling element retainer belt is deformed due to the resistance when moving in the direction changing passage.

As shown in FIG. 8, for dealing with the resistance, the recesses 4 are respectively defined the upper spacer 31, the lower spacer 32 and the separation portion 22. When the rolling element retainer belt 1 enters into the direction changing passage 130, the curved surfaces 33b, 34b of the upper and lower spacers 31, 32 partially deform toward the separation portion 22 of the belt 2 to reduce the resistance resulted from the displacement Δ of the direction changing passage 130, and to provide sufficient force to retain the rolling elements 5 to move smoothly in the circulating passage 100. Furthermore, the structural strength of the connection portions between the upper and lower spacers 31, 32 and the separation portion 22 is strong enough to bear the continuous deformation.

While we have shown and described the embodiment in accordance with the present invention, it should be clear to those skilled in the art that further embodiments may be made without departing from the scope of the present invention.

What is claimed is:

1. A rolling element retainer belt comprising:
   an elongate and flat belt and multiple separators, the belt having multiple holes defined axially therein and separation portions located between the holes, each separator having an upper spacer and a lower spacer, the upper and lower spacers located on two sides of the separation portion, and characterized by:
   two recesses respectively defined between the upper spacer and the separation portion and between the lower spacer and the separation portion, the two respective recesses located at different sides of the upper and the lower spacers.

2. The rolling element retainer belt as claimed in claim 1, wherein each hole defines an inner surface between the upper and lower spacers and located in a direction perpendicular to the belt, the upper and lower spacers each have a smooth surface located adjacent to the hole, the smooth surfaces each partially have a rolling element mounting surface which is smoothly connected with the inner surface of the belt, the inner surface is connected with the rolling element mounting surface of the adjacent upper spacer or the adjacent lower spacer to form a top mounting surface or a lower mounting surface, the rolling element mounting surface has an opening and a part of the smooth surface extends from the opening in tangent direction and forms a curved surface, the direction of the opening of the top mounting surface/lower mounting surface is located at an angle between the vertical direction and the horizontal direction of the belt, the rolling element mounting surfaces of the upper spacer and the lower spacer are located on opposite sides, the directions of the openings are opposite to each other, the recesses are located in the curved surfaces of the smooth surfaces.

3. The rolling element retainer belt as claimed in claim 2, wherein the rolling element mounting surfaces are spherical mounting surfaces.

4. The rolling element retainer belt as claimed in claim 2, wherein the rolling element mounting surfaces are cylindrical mounting surfaces.

5. The rolling element retainer belt as claimed in claim 2, wherein the curved surfaces are cylindrical surfaces.

6. The rolling element retainer belt as claimed in claim 2, wherein the curved surfaces are cone-shaped surfaces.

7. A linear motion guide apparatus using the rolling element retainer belt of claim 1, comprising:
   a rail having a first passage in a side thereof;
   a block mounted to the rail and having a second passage which is located corresponding to the first passage, two direction changing passages located on two ends of the second passage, the two direction changing passages connected with a straight return passage, a circulating passage being formed by the second passage, the direction changing passages and the return passage, the circulating passage having at least one enclosed guide slot defined therein, and
   the rolling element retainer belt having at least one of two sides thereof located in the guide slot, the rolling element retainer belt having holes defined therein and each hole having a rolling element received therein, the rolling element retainer belt moving along the circulating passage by moving the rolling elements within the circulating passage.

8. The linear motion guide apparatus as claimed in claim 7, wherein each hole defines an inner surface between the upper and lower spacers and located in a direction perpendicular to the belt, the upper and lower spacers each have a smooth surface located adjacent to the hole, the smooth surfaces each partially have a rolling element mounting surface which is smoothly connected with the inner surface of the belt, the inner surface is connected with the rolling element mounting surface of the adjacent upper spacer or the adjacent lower spacer to form a top mounting surface or a lower mounting surface, the rolling element mounting surface has an opening and a part of the smooth surface extends from the opening in tangent direction and forms a curved surface, the direction of the opening of the top mounting surface/lower mounting surface is located at an angle between the vertical direction and the horizontal direction of the belt, the rolling element mounting surfaces of the upper spacer and the lower spacer are located on opposite sides, the directions of the openings are opposite to each other, the recesses are located in the curved surfaces of the smooth surfaces.

9. The linear motion guide apparatus as claimed in claim 8, wherein the rolling element mounting surfaces are spherical mounting surfaces.

10. The linear motion guide apparatus as claimed in claim 8, wherein the rolling element mounting surfaces are cylindrical mounting surfaces.

11. The linear motion guide apparatus as claimed in claim 8, wherein the curved surfaces are cylindrical surfaces.

12. The linear motion guide apparatus as claimed in claim 8, wherein the curved surfaces are cone-shaped surfaces.

* * * * *